United States Patent [19] [11] 3,979,065
Madden [45] Sept. 7, 1976

[54] COOLING LINER FOR AN EXHAUST NOZZLE
[75] Inventor: William M. Madden, Palm Springs, Fla.
[73] Assignee: United Technologies Corporation, Hartford, Conn.
[22] Filed: Oct. 31, 1974
[21] Appl. No.: 519,739

[52] U.S. Cl. .......................... 239/127.3; 60/39.66; 239/265.39
[51] Int. Cl.² ................. B64D 33/08; B64C 15/06
[58] Field of Search ............. 239/127.1, 127.3, 128, 239/132–132.5, 265.11, 265.19, 265.39, 265.41; 60/39.23, 39.65, 39.66, 39.67

[56] References Cited
UNITED STATES PATENTS
2,801,516  8/1957  Battle et al. ............... 239/127.1 X
2,910,829  11/1959 Meyer ......................... 239/132
2,989,845  6/1961  Howald ...................... 239/265.41
3,730,436  5/1973  Madden et al. ............. 239/265.39

Primary Examiner—Evon C. Blunk
Assistant Examiner—Andres Kashnikow
Attorney, Agent, or Firm—Jack N. McCarthy

[57] ABSTRACT

An exhaust nozzle has main flaps with seals therebetween. Each flap and seal is constructed having inner and outer members which cooperate to form a liner for cooling air therethrough which extends substantially around the entire circumference of the liner. This arrangement provides a construction for cooling airflow which is compatible with nozzle diameter change. While the seal basically floats, it is maintained in place longitudinally and circumferentially so that leakage does not occur between the flaps. The coolant flows through the flaps and seals of the convergent section of the nozzle and is directed over the divergent section of the nozzle.

11 Claims, 7 Drawing Figures

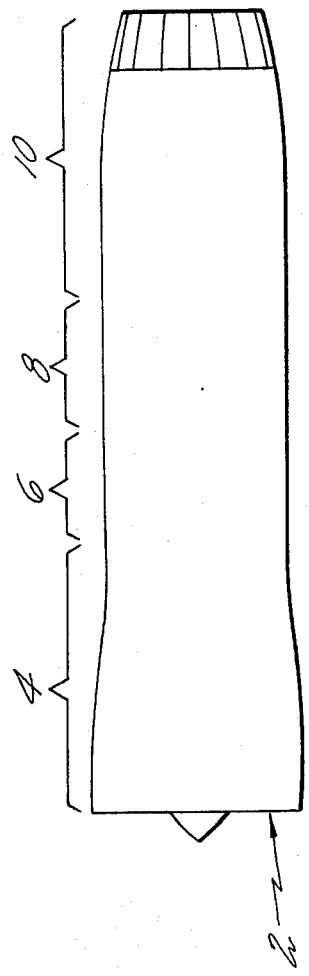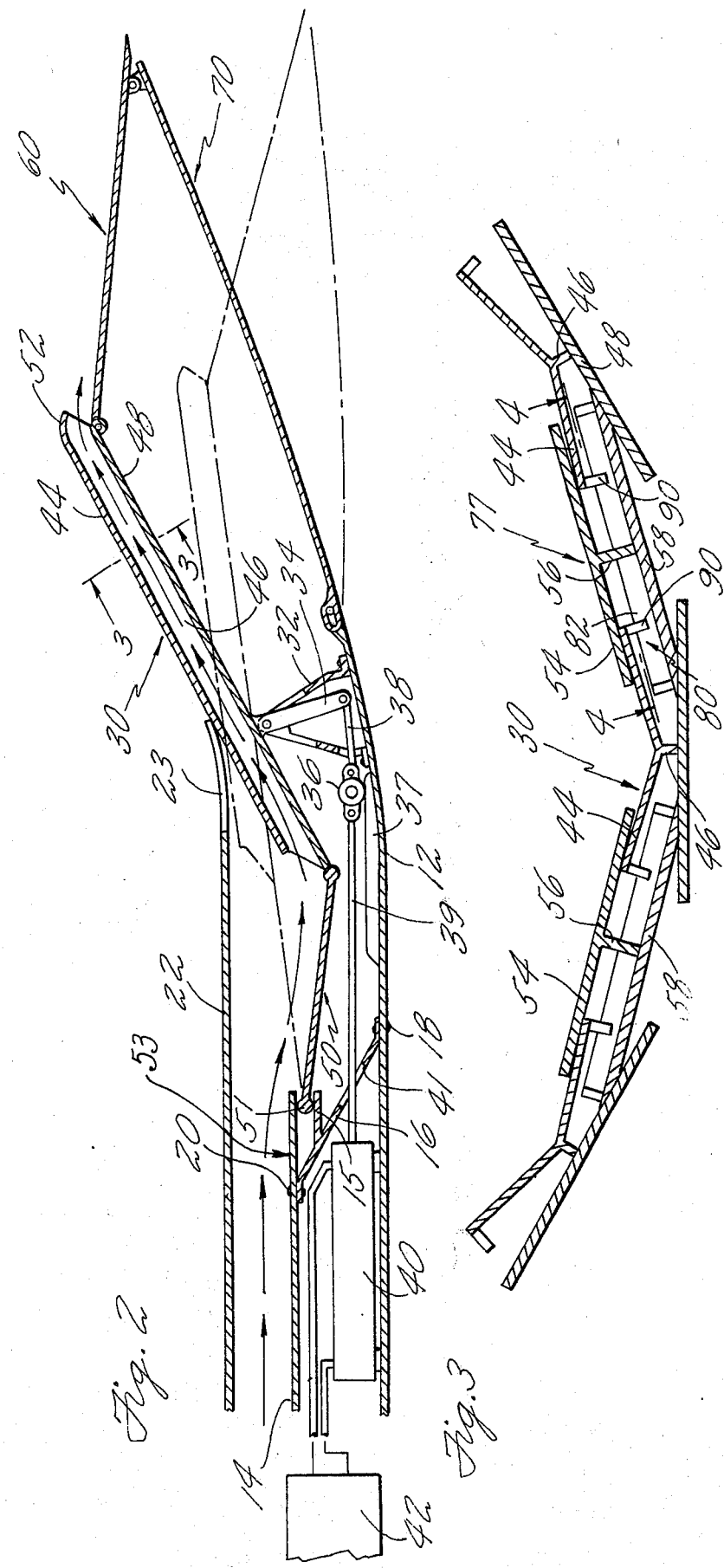

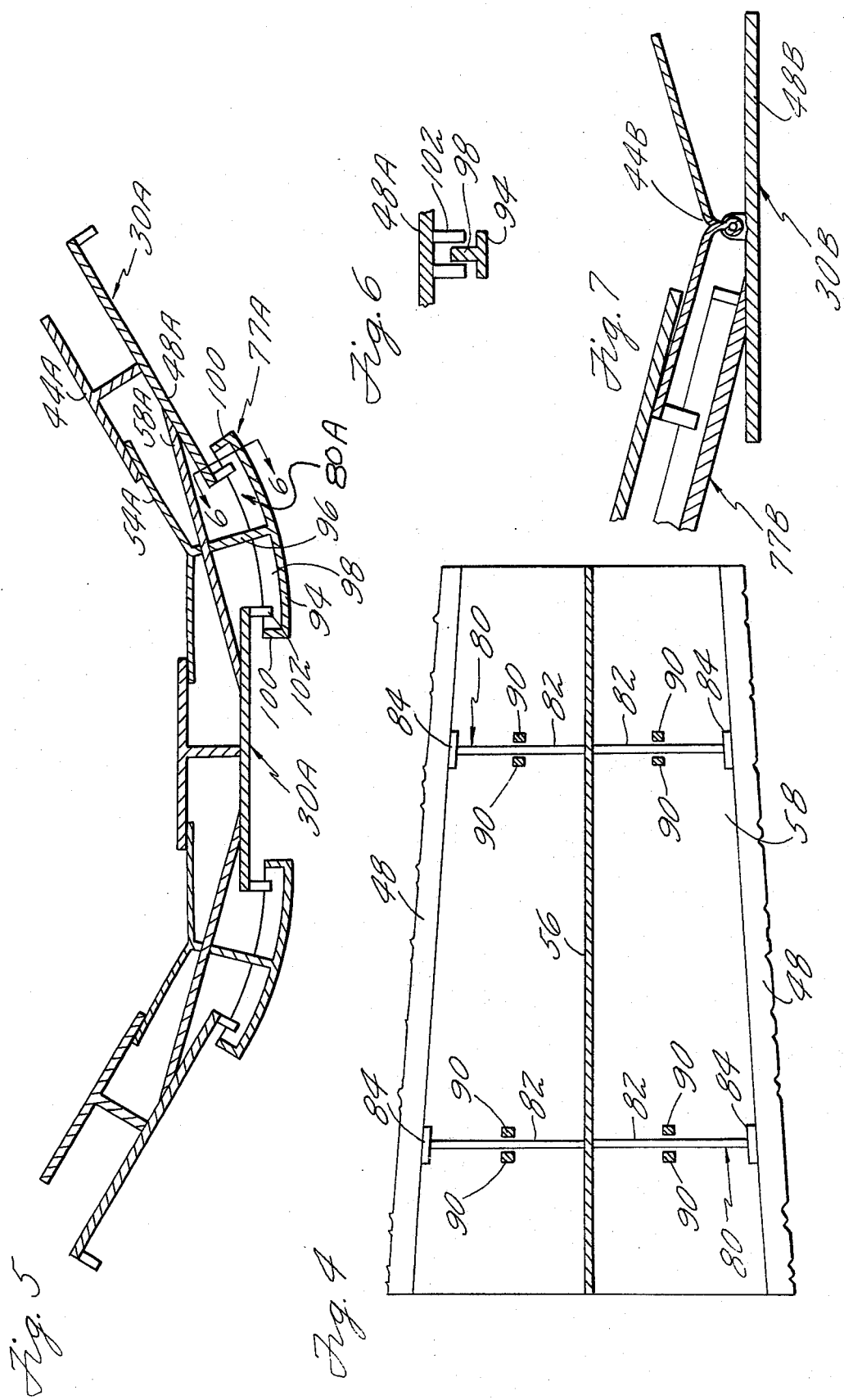

COOLING LINER FOR AN EXHAUST NOZZLE

BACKGROUND OF THE INVENTION

This invention relates to a variable geometry nozzle to be used on an augmented turbofan engine and particularly to means for providing a cooling fluid directly to said nozzle.

While many cooled nozzles are in the prior art, none appear to provide the cooperating movement between the flaps and seals to provide a cooling liner which functions while the nozzle changes its position between a small and large area. Three patents showing variable area nozzles with coolant flow are U.S. Pat. No. 2,801,516, U.S. Pat. No. 2,989,845 and U.S. Pat. No. 3,046,730.

SUMMARY OF THE INVENTION

It is an object of this invention to provide a basic construction for a nozzle cooling liner wherein cooling air flows through the nozzle and seal means while the nozzle is permitted to move between a position of small area and a position of large area.

It is an object of this invention to provide a floating seal which will permit cooling air to flow through the flaps and seals while providing for longitudinal and circumferential positioning of the floating seals.

An object of this invention is to provide a construction which can vary for an engine design so that the inner member of the seal can be positioned to contact the inner surface of the inner flap member or outer surface of the inner flap member depending on the relation of the pressure in the engine exhaust acting on the seal to its pressure in the liner acting on the seal.

BRIEF DESCRIPTION OF THE DRAWING

FIG. 1 is a view illustrating the location of a nozzle on a turbojet engine.

FIG. 2 is an enlarged sectional schematic view taken through the nozzle and the rear portion of the engine shows the cooling liner on a nozzle flap.

FIG. 3 is an enlarged view taken along the line 3—3 of FIG. 2 showing the flaps and seals.

FIG. 4 is a view taken along the line 4—4 of FIG. 3.

FIG. 5 is an enlarged view of a modified construction of a cooling liner on a nozzle flap at substantially a full open position of the nozzle.

FIG. 6 is a view taken along the line 6—6 of FIG. 5.

FIG. 7 is a modification of the construction of the nozzle flap.

DESCRIPTION OF THE PREFERRED EMBODIMENT

Referring to FIG. 1, the engine 2 shown includes the conventional compressor section 4, the burner section 6, turbine section 8, and exhaust duct and nozzle section 10. In FIG. 2, the inner case 14 is shown fixed to the outer housing structure 12 by a conical shaped connecting member 16. This member is attached to the outer housing by bolts 18 and extends forwardly to a point where it is connected to the inner casing by bolts 20, forming the section of a cone. An inner liner 22 is positioned around and fixedly spaced from the inner side of inner case 14. Spaced fingers 23 extend rearwardly from the end of the inner liner 22 and are formed to be resilient for a purpose to be hereinafter described.

A plurality of main flaps 30 are mounted for pivotal movement at the rear end of the outer housing structure 12. These flaps are each pivotally mounted on a bracket member 32 which extends inwardly from the end of the structure 12. An actuating arm 34 extends outwardly from each flap and movement of the arm actuates the attached main flap 30 about its pivotal mounting. Each flap 30 is pivotally mounted at a desired balance point. In one nozzle design, this location was made approximately one-third of the distance from its forward edge.

So that all the main flaps 30 are moved in unison, the free end of each of the arms 34 is connected to a unison ring 36 by a connecting link 38. A plurality of actuators 40 are mounted in the space between the housing structure 12 and the inner case 14 in front of the connecting member 16. An actuating rod 39 extends from each of the actuators 40 and is attached to the unison ring 36. The unison ring 36 is centered within and slides on track members 37 spaced around the outer housing structure 12. Each actuating rod 39 extends through an opening 41 in the connecting member 16. A nozzle control 42 connects one side of the actuator to an actuating pressure while opening the opposite side to drain thereby movably positioning the main flaps 30. An arrangement of this type is shown in U.S. Pat. No. 2,815,643.

A plurality of balance flaps 50 extend forwardly of the main flaps 30. Each flap 50 has its rearward end pivotally connected to the forward end of a main flap 30 while its forward end has cylindrical means 51 thereon which is mounted for axial movement in a track means 53. Each track means 53 is formed between a rearward extension of the inner case 14 and a rearward extending flange 15 on the connecting member 16. While a simple cylinder and track means has been shown, any type of device permitting axial movement along with a change in angular position of the balance flap 50 can be used.

A plurality of divergent flaps 60 extend rearwardly of the main flaps 30. Each flap 60 has its forward end pivotally connected to the rearward end of a main flap 30 while its rearward end is pivotally connected to the rear end of an external flap 70. Each external flap 70 has its forward end pivotally mounted at the rear end of the housing structure 12, just rearwardly of the bracket members 32. Each of these pivotal connections can include a lost-motion movement.

Each of the annular set of flaps, the balance flaps 50, the main flaps 30, the divergent flaps 60, and the external flaps 70, have seal means positioned along adjacent side edges of cooperating flaps to prevent an excessive amount of leakage therebetween. Seal means for this type of nozzle are shown in U.S. Pat. No. 3,730,436 and U.S. Pat. No. 3,794,244.

The balance flaps 50, the diverging flaps 60 and the external flaps 70 can have simple seal flaps located therebetween for sealing, however, the main flaps 30 have a seal means 77 which cooperates with the main flaps 30 to provide a cooling liner around the flaps which can vary to provide liner circumferential continuity while the nozzle changes position.

As seen in FIG. 2, each main flap 30 includes an inner flap member 44 which is connected by a rib member 46 along its length at the center thereof to the center of an outer flap member 48. While the rib member 46 can be continuous, it can also be made of a plurality of smaller members, in line, providing for flow therearound, or have holes therethrough. Said inner flap member 44 extends for approximately the length and width of the outer flap member 48. The rear end of each inner flap member 44 is curved outwardly at 52 to direct a coolant flow from between the inner flap member 44 and outer flap member 48 along the inner surface of divergent flaps 60. The forward end of the flap 30 receives a cooling fluid between the inner flap member 44 and outer flap member 48 from between the inner liner 22 and inner case 14 and balance flaps 50 (note airflow arrows). This flow can be directed from any source desired. The spaced fingers 23 contact the inner surface of the inner flap members 44 at a point inwardly from the connection of actuating arms 34.

To provide for sealing between the flaps 30 and maintain a cooling liner at this point, each seal means 77 includes an inner seal member 54 which is connected by a rib member 56 along its length at the center thereof to the center of an outer seal member 58, said inner seal member 54 extends for approximately the length and width of the outer seal member 58. Rib member 56 can also be formed with holes therein to permit flow therethrough, or of a plurality of smaller members. Outer seal member 58 is positioned with each side extending into the space between the outer flap member 48 and inner flap member 44 of each adjacent flap 30. Each inner seal member 54 extends over the inner face of the adjacent portion of the adjacent inner flap members 44. This arrangement places the inner flap member 44 of each main flap 30 extending between the inner seal member 54 and outer seal member 58 of the adjacent seal means 77.

To maintain each seal means 77 in place longitudinally and circumferentially with respect to adjacent main flaps 30 on each side, two guide and stop devices 80 are provided between the seal means 77 and adjacent main flaps 30. Each guide and stop device 80 includes a guide, or rib, 82 on the seal means 77 which extends laterally from each side of the rib member 56 to a point adjacent the edge of each side of the outer seal member 58. Fixed to the outer edge of each guide, or rib, 82 is a stop member 84 which extends on both sides of the guide, or rib 82 for a purpose to be hereinafter described.

Each guide and stop device 80 includes two sets of projections 90 on the flaps 30 which extend outwardly from a point adjacent the side edge of each inner flap member 44. The projections of each set are located on each side of a guide, or rib, 82 on the seal means 77. It can be seen from FIG. 4 that these projections prevent longitudinal movement of the seal means 77 with respect to the adjacent main flaps 30 and also restrict circumferential movement and insure sealing by the use of the stops 84. It can be seen that a gap is prevented from being formed between an outer flap member 48 and an outer seal member 58. For ease of assembly, the stop members 84 can be made removable by being bolted into the ends of guides or ribs 82.

FIG. 5 shows a modified construction of the main flaps 30A and seal means 77A to provide for an essentially continuous annulus for cooling airflow. In this construction, each seal means 77A includes an inner seal member 54A and outer seal member 58A which both extend between the inner flap member 44A and outer flap member 48A of an adjacent main flap 30A. To maintain each seal means 77A in place longitudinally and circumferentially with respect to adjacent main flaps 30A, in this modification, two guide and stop devices 80A are provided between the seal means 77A and adjacent main flaps 30A. Each guide and stop device 80A includes a cross-member 94 which is connected to the outer surface of outer seal member 58A by a short projection 96. The cross-member 94 extends circumferentially over the outer side portion of the outer surface of each adjacent outer flap member 48A, and is spaced outwardly therefrom. The member 94 is formed of an inverted T-shape as shown in FIG. 6 with a portion 98 forming a guide, or rib. While member 94 is shown formed of an inverted T-shape, it can be simply shaped as a flat rib, the thickness of the portion 98. Fixed to the outer edge of each guide, or rib, 98 is a stop member 100 which extends on both sides of said guide or rib, for the same purpose as the stop member 84 in the first modification. Two sets of projections 102 extend outwardly from two locations adjacent the side edge of each adjacent outer flap member 48A. The projections of each set are located on each side of a guide, or rib, 98 on the seal means 77A.

In a construction shown in FIG. 3 the main flap 30B can be constructed as shown in FIG. 7 with each half of the inner flap member 44B being comprised of a separate member pivotally mounted at an edge to the center of the inner surface of the outer flap member 48B, each half of the inner flap member 44B being pivotally movable independently of each other. This can be done in the manner of a piano hinge. The flap means 77B would be constructed in the same manner as it was in FIG. 3.

In the modification shown in FIG. 3 each half of the inner flap member 44 extending outwardly from the rib member 46 can be made with a degree of flexibility which will provide the desired contact between the flaps 30 and the seal means 77.

I claim:
1. In combination with jet engine fixed structure including an exhaust duct, an exhaust nozzle mounted on said fixed structure, said nozzle comprising a circumferential row of flaps, means pivotally mounting said flaps on said fixed structure for controlling the flow area of said exhaust duct, seal means being positioned between each pair of flaps to prevent leakage therebetween, said flaps comprising an inner flap member having an outer flap member spaced therefrom, said seal means comprising an inner seal member having an outer seal member spaced therefrom, said inner seal member being positioned to cooperate with each adjacent inner flap member and said outer seal member being positioned to cooperate with each adjacent outer flap member providing a passageway for coolant flow through said flaps and seals said passageway having an inlet and outlet, means for directing a coolant flow into the inlet of said passageway.

2. A combination as set forth in claim 1 wherein guide means are included between each flap and adjacent seal means to position said seal means longitudinally and circumferentially.

3. A combination as set forth in claim 2 wherein said guide means includes a laterally extending rib connected to said outer seal member and two spaced projections extending from each adjacent flap, said projections being placed on each side of a rib.

4. A combination as set forth in claim 2 wherein said guide means includes a laterally extending rib on the inner surface of the outer seal member and two spaced projections extending from the outer surface of the inner flap member, said projections being placed on each side of the rib.

5. A combination as set forth in claim 2 wherein said outer seal member extends between the inner flap member and outer flap member of each adjacent flap, said guide means being positioned between said outer seal member and said inner flap member.

6. A combination as set forth in claim 1 wherein said flaps are convergent flaps, divergent flaps extending rearwardly of said convergent flaps, said divergent flaps having their forward ends pivotally mounted to the rearward ends of said convergent flaps, said divergent flaps also being pivotally connected downstream of their forward ends to said fixed structure, said coolant flow being directed from said passageway outlet over the inner surface of said divergent flaps.

7. A combination as set forth in claim 6 wherein the rearward end of each divergent flap is pivotally connected to said fixed structure through a connecting member.

8. A combination as set forth in claim 7 wherein said connecting member is a third flap.

9. A combination as set forth in claim 1 wherein a cooling liner extends around said exhaust duct forming an annular duct, means for directing a coolant into the annular duct, said means for directing a coolant into the inlet of said passageway including a connecting means between said annular duct and said inlet of said passageway.

10. A combination as set forth in claim 9 wherein said connecting means includes a sealing means between the exhaust duct and the inner flap member and inner seal member.

11. A combination as set forth in claim 10 wherein said connecting means includes a second sealing means between the cooling liner and the outer flap member and outer seal member.

* * * * *